(12) United States Patent
Brockway et al.

(10) Patent No.: US 12,168,990 B2
(45) Date of Patent: Dec. 17, 2024

(54) METHOD AND TOOL FOR INSTALLING A FASTENER

(71) Applicant: The Boeing Company, Chicago, IL (US)

(72) Inventors: Monica Joy Brockway, Bothell, WA (US); Farahnaz Sisco, Mukilteo, WA (US); Mekonnen Tsegga, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 17 days.

(21) Appl. No.: 17/543,660

(22) Filed: Dec. 6, 2021

(65) Prior Publication Data

US 2022/0178398 A1    Jun. 9, 2022

Related U.S. Application Data

(60) Provisional application No. 63/122,921, filed on Dec. 8, 2020.

(51) Int. Cl.
*F16B 19/10* (2006.01)
*B21J 15/04* (2006.01)
*B21J 15/12* (2006.01)
*B21J 15/32* (2006.01)

(52) U.S. Cl.
CPC ......... *F16B 19/1072* (2013.01); *B21J 15/043* (2013.01); *B21J 15/12* (2013.01); *B21J 15/32* (2013.01); *F16B 19/1054* (2013.01)

(58) Field of Classification Search
CPC ............. F16B 19/1054; F16B 19/1072; B25B 27/0014; B21J 15/043–045; B21J 15/12; B21J 15/26
See application file for complete search history.

(56) References Cited

U.S. PATENT DOCUMENTS 3,181,338 A * 5/1965 Zetterlund .......... B25B 27/0014
29/524.1
4,604,889 A 8/1986 Sukharevsky
(Continued)

FOREIGN PATENT DOCUMENTS

FR    2904385 B1    9/2008
FR    3102386 A1    4/2021
FR    3117049 A1    10/2022

OTHER PUBLICATIONS

Friot, D., et al. "LISI#OneSide, a Set of Solutions for Efficient Blind Fastener Installation," SAE Technical Paper 2017-01-2098, 2017, doi: 10.4271/2017-01-2098.
(Continued)

*Primary Examiner* — Matthew P Travers
(74) *Attorney, Agent, or Firm* — Jordan IP Law, LLC

(57) ABSTRACT

A method is provided for installing a fastener into an opening of a structure. The fastener includes a sleeve and a pin threadably received into the sleeve. The method includes inserting the fastener into the opening, grabbing a pintail of the pin, and deforming a tail of the sleeve radially outward relative to a centerline axis of the fastener by automatically displacing the pin longitudinally along the centerline axis relative to the sleeve. The method also includes rotationally shearing the pintail of the pin from a shaft of the pin.

12 Claims, 12 Drawing Sheets

(56) References Cited

U.S. PATENT DOCUMENTS

| | | | |
|---|---|---|---|
| 4,762,261 A * | 8/1988 | Hawly | B21J 15/14 |
| | | | 227/111 |
| 4,807,498 A | 2/1989 | Kleiser et al. | |
| 4,836,062 A | 6/1989 | LaTorre | |
| 6,732,563 B1 * | 5/2004 | Chen | B25B 27/0014 |
| | | | 72/391.8 |
| 6,748,642 B2 | 6/2004 | Tsegga et al. | |
| 6,868,757 B2 | 3/2005 | Hufnagl et al. | |
| 7,308,842 B2 | 12/2007 | Hufnagl et al. | |
| 9,669,457 B2 | 6/2017 | Bigot et al. | |
| 10,072,694 B2 | 9/2018 | Woods et al. | |
| 10,894,284 B2 | 1/2021 | Park et al. | |
| 2003/0150093 A1 * | 8/2003 | Campbell | B25B 27/0014 |
| | | | 29/407.05 |
| 2007/0029577 A1 | 2/2007 | Kinoshita et al. | |
| 2008/0002581 A1 | 1/2008 | Gorsetman et al. | |
| 2010/0180424 A1 * | 7/2010 | Le Vacon | B23P 19/06 |
| | | | 29/505 |
| 2012/0167366 A1 * | 7/2012 | Mauer | B21J 15/025 |
| | | | 29/407.01 |
| 2014/0130335 A1 * | 5/2014 | Bickford | F16B 19/1072 |
| | | | 29/525.02 |
| 2015/0019695 A1 | 1/2015 | Singh et al. | |
| 2015/0196951 A1 * | 7/2015 | Bigot | B25B 27/0007 |
| | | | 29/243.526 |
| 2018/0238372 A1 | 8/2018 | Villet et al. | |
| 2019/0113063 A1 | 4/2019 | Meiffre et al. | |
| 2019/0186522 A1 | 6/2019 | Pailhories et al. | |
| 2019/0283109 A1 | 9/2019 | Leger et al. | |
| 2020/0072271 A1 | 3/2020 | Couderc | |
| 2020/0230691 A1 * | 7/2020 | Simpson | B21J 15/30 |
| 2022/0234149 A1 | 7/2022 | Broucke et al. | |

OTHER PUBLICATIONS

Observations by third parties, European Application No. 21206502.3, dated Dec. 15, 2023, 26 pages.

"RIVKLER® 2007—Electro-hydraulic technology," Böllhoff Group, Jun. 3, 2016. https://www.youtube.com/watch?v=s_wWBht8dpk.

Extended European Search Report, Application No. 24182895.3, Dated Sep. 4, 2024, Nine Pages.

* cited by examiner

METHOD AND TOOL FOR INSTALLING A FASTENER

CROSS-REFERENCE TO RELATED APPLICATION

This application claims the benefit of and priority to U.S. Provisional Application No. 63/122,921, entitled "METHOD AND TOOL FOR INSTALLING A FASTENER", filed Dec. 8, 2020, which is incorporated by reference herein in its entirety.

BACKGROUND

Some known one-sided (i.e., blind) fasteners are installed by slip-fitting the fastener into a hole of a structure and applying torque to a pin of the fastener. Rotation of the pin deforms a tail of the fastener such that the tail expands to form a retention feature over the back of the structure. However, manual installation of at least some known one-sided fasteners (e.g., using one or more manually-operated hand tools, etc.) may be difficult and/or inefficient. For example, the strength required to manually install a one-sided fastener may make it difficult for an individual to complete installation, particularly if the individual is required to consecutively install a group of fasteners. Moreover, and for example, manually installing one-sided fasteners may be time-consuming and/or labor intensive.

SUMMARY

In one aspect, a method is provided for installing a fastener into an opening of a structure. The fastener includes a sleeve and a pin threadably received into the sleeve. The method includes inserting the fastener into the opening, grabbing a pintail of the pin, and deforming a tail of the sleeve radially outward relative to a centerline axis of the fastener by automatically displacing the pin longitudinally along the centerline axis relative to the sleeve. The method also includes rotationally shearing the pintail of the pin from a shaft of the pin.

In another aspect, a method is provided for installing a fastener into an opening of a structure using a tool. The fastener includes a sleeve and a pin threadably received into the sleeve. The method includes inserting the fastener into the opening, clamping a clamp of the tool to a pintail of the pin, and deforming a tail of the sleeve radially outward relative to a centerline axis of the fastener by activating a linear actuator to displace the clamp longitudinally along the centerline axis relative to the structure such that the pin is displaced longitudinally along the centerline axis relative to the sleeve. The method also includes grabbing the pintail of the pin with a wrench of the tool that is interconnected with the clamp, and rotationally shearing the pintail of the pin from a shaft of the pin by activating a rotary actuator to rotate the wrench of the tool.

In another aspect, a tool is provided for installing a fastener that includes a sleeve and a pin threadably received into the sleeve. The tool includes a frame and a clamp mounted to the frame such that the clamp is configured to move longitudinally relative to the frame. The clamp is configured to grab a pintail of the pin of the fastener. The tool includes a linear actuator operatively connected to the clamp such that the linear actuator is configured to drive linear movement of the clamp relative to the frame. The tool includes a wrench mounted to the frame such that the wrench is configured to rotate relative to the frame. The wrench is configured to grab the pintail of the pin. The tool includes a rotary actuator operatively connected to the wrench such that the rotary actuator is configured to drive rotation of the wrench relative to the frame.

DETAILED DESCRIPTION

Figure 1:
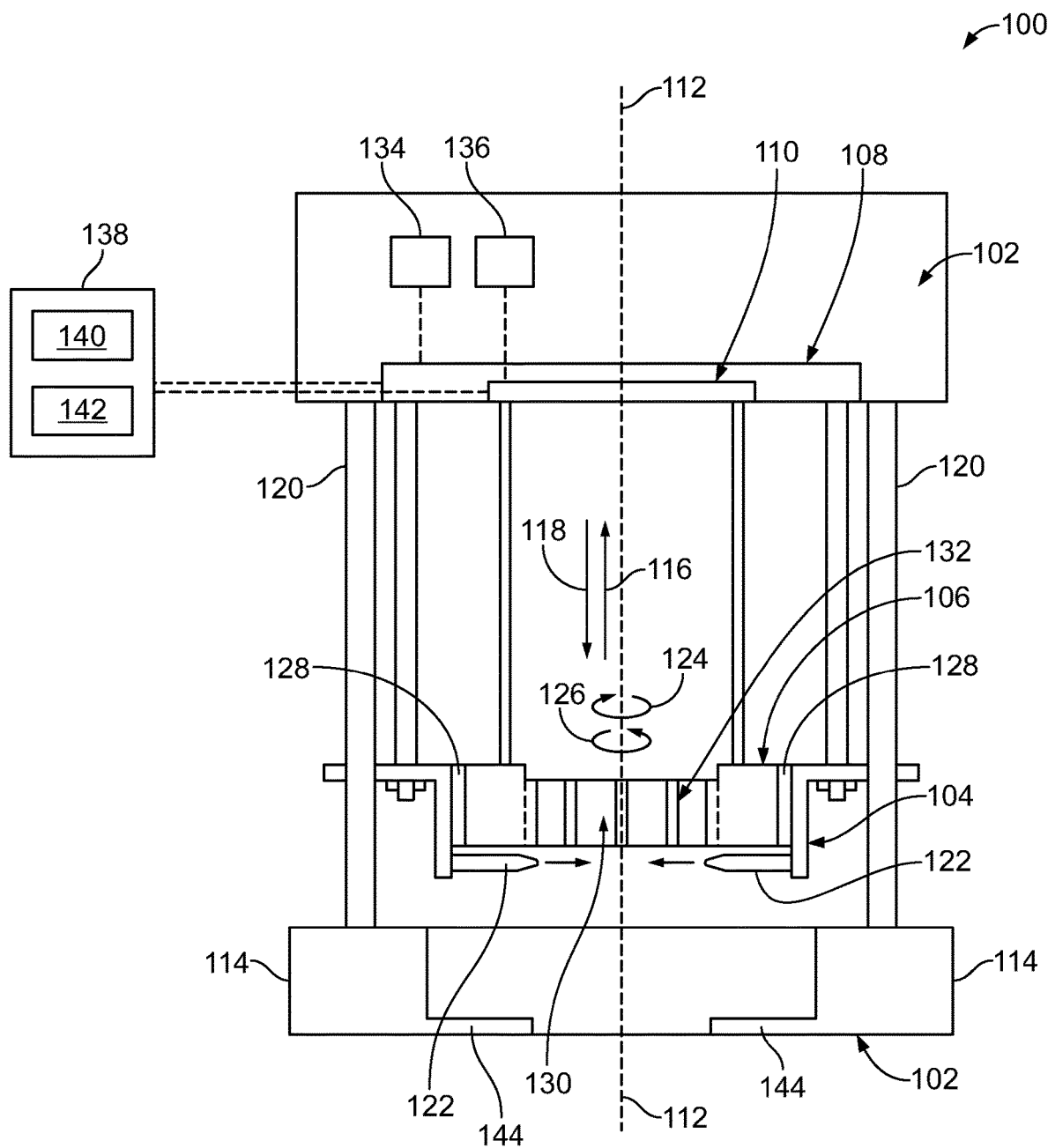
FIG. 1 is a cross-sectional schematic diagram illustrating a tool for installing a fastener according to an implementation.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to "one implementation" are not intended to be interpreted as excluding the existence of additional implementations that also incorporate the recited features. Moreover, unless explicitly stated to the contrary, implementations "comprising" or "having" an element or a plurality of elements having a particular property can include additional elements not having that property.

While various spatial and directional terms, such as "top," "bottom," "upper," "lower," "vertical," and the like are used to describe implementations of the present disclosure, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90°, and the like.

Certain implementations of the present disclosure provide methods and tools for installing a fastener into an opening of a structure. These implementations provide for inserting the fastener into the opening, grabbing a pintail of the pin, and deforming a tail of the sleeve radially outward relative to a centerline axis of the fastener by automatically displacing the pin longitudinally along the centerline axis relative to the sleeve. The pintail of the pin is also rotationally sheared from a shaft of the pin.

Certain implementations of the present disclosure provide methods and tools that operate in an unconventional manner to install fasteners. Certain implementations of the present disclosure provide methods and tools that enable installation of a one-sided fastener by longitudinally displacing and rotating the pin of the fastener. Certain implementations of the present disclosure enable automated installation of fasteners. Certain implementations of the present disclosure enable fasteners to be installed in a transition or interference fit condition. Certain implementations of the present disclosure decrease the difficulty of installing fasteners. For example, certain implementations of the present disclosure reduce the effort required to install fasteners. Certain implementations of the present disclosure provide methods and tools that more efficiently install fasteners. For example, certain implementations of the present disclosure are less time-consuming and/or labor intensive.

With references now to the figures, a cross-sectional schematic diagram of a tool 100 for installing a fastener (e.g., the fastener 200 shown in FIGS. 2-4, etc.) is provided in FIG. 1. The tool 100 includes a frame 102, a clamp 104 mounted to the frame 102, a wrench 106 mounted to the frame 102, a linear actuator 108, and a rotary actuator 110. The clamp 104 is configured to move longitudinally relative to the frame 102, and the wrench 106 is configured to rotate relative to the frame 102. Linear movement of the clamp 104 relative to the frame 102 is driven by the linear actuator 108. Rotation of the wrench 106 relative to the frame 102 is driven by the rotary actuator 110. As will be described in more detail below, the linear actuator 108 and the rotary actuator 110 enable the fastener to be installed using automatic linear movement of the clamp 104 and automatic rotation of the wrench 106, respectively.

The frame 102 extends a length along a central longitudinal axis 112. The frame 102 includes a base 114. During installation of the fastener, the base 114 of the frame 102 is configured to engage in physical contact with the fastener (e.g., the fastener 200 shown in FIGS. 2-4, etc.) and/or a structure (e.g., the structure 250 shown in FIG. 4, etc.) into which the fastener is being installed. As used herein, the term "frame" includes a support structure of any type having any size, shape, and geometry, such as, but not limited to, a housing, a base, a case, a frame as shown and described herein, and/or the like. In other words, the frame 102 is not limited to the particular implementation shown herein, but rather may additionally or alternatively include any other structure that enables the tool 100 to function as described and/or illustrated herein.

The clamp 104 is mounted to the frame 102 such that the clamp 104 is configured to move longitudinally relative to the frame 102. Specifically, the clamp 104 is configured to move longitudinally relative to the frame 102 along the central longitudinal axis 112, as indicated by the arrows 116 and 118 in FIG. 1. The directions 116 and 118 are parallel to the central longitudinal axis 112. As will be described below, linear movement of the clamp 104 relative to the frame 102 during installation of the fastener enables the clamp 104 to move longitudinally along a centerline axis (e.g., the centerline axis 202 shown in FIGS. 2-4, etc.) of the fastener relative to the structure within which the fastener is being installed. In the implementation shown herein, the clamp 104 is mounted on rods 120 of the frame 102. The rods 120 define rails along (i.e., on) which the clamp 104 travels as the clamp 104 moves longitudinally along the central longitudinal axis 112 relative to the frame 102. In other words, the clamp 104 moves along both the rods/rails 120 and the central longitudinal axis 112. But, in addition or alternatively to the rods 120, the clamp 104 is mounted to the frame 102 using any other mechanism, structure, and/or the like that enables the clamp 104 to move longitudinally relative to the frame 102 along the central longitudinal axis 112, such as, but not limited to, bearings, gears, tracks, pulleys, guides, cables, chains, other types of rods, other types of rails, and/or the like.

The clamp 104 is configured to grab a pintail (e.g., the pintail 218 shown in FIGS. 2-4, etc.) of a pin (e.g., the pin 206 shown in FIGS. 2-4, etc.) of the fastener. In other words, the clamp 104 is configured to clamp to the pintail of the fastener. When clamped to the pintail of the fastener, longitudinal movement of the clamp 104 relative to the frame 102 enables the clamp 104 to move (i.e., displace) the pin of the fastener longitudinally along the centerline axis (e.g., the centerline axis 202 shown in FIG. 2-4, etc.) of the fastener relative to a sleeve (e.g., the sleeve 204 shown in FIGS. 2-4, etc.) of the fastener, as will be described below. The centerline axis of the fastener is parallel with the central longitudinal axis 112 when the fastener is held by the tool.

The clamp 104 may include any clamping mechanism that enables the clamp 104 to grab the pintail of the fastener such that the clamp 104 is enabled to displace (e.g., configured to displace, capable of displacing, etc.) the pin of the fastener longitudinally along the centerline axis of the fastener relative to the sleeve of the fastener. In the implementation shown herein, the clamping mechanism of the clamp 104 includes two or more jaws 122 that can be moved (e.g., tightened, etc.) radially inward toward the central longitudinal axis 112 to thereby squeeze the pintail of the pin therebetween. But, the clamp 104 additionally or alternatively may include any other clamping mechanism that enables the clamp 104 to function as described and/or illustrated herein, such as, but not limited to, collars, collets, bands, other circular and semi-circular clamping mechanisms, dogs, other types of jaws, and/or the like.

Moreover, the clamping mechanism of the clamp 104 may be configured to clamp to (i.e., grab) any structure of the pintail of the pin that enables the clamp 104 to function as described and/or illustrated herein. In other words, the clamping mechanism of the clamp 104 may be configured to grab one or more of a variety of different structures of the pintail. For example, the jaws 122 of the clamp 104 are configured to grab a neck (e.g., the neck 228 shown in FIGS. 2-4, etc.) of the pintail. Other examples of a pintail structure that the clamping mechanism of the clamp 104 may be configured to grab (i.e., clamp to) include, but are not limited to, collars, flanges, lobes, textured surfaces, and/or the like.

The clamping mechanism (e.g., the jaws 122, etc.) of the clamp 104 may be actuated to grab the pintail by any power source, mechanism, structure, and/or the like, such as, but not limited to: manually using one or more gears, teeth, handles, knobs, levers, and/or keys (e.g., a chuck key, etc.); automatically using a pneumatic, electric, and/or hydraulic power source; and/or the like.

As briefly described above, the tool 100 includes the linear actuator 108 for longitudinally moving the clamp 104. Specifically, the linear actuator 108 is operatively connected to the clamp 104 such that the linear actuator 108 is configured to drive (e.g., actuate, enable, allow, etc.) linear movement of the clamp 104 along the central longitudinal axis 112 relative to the frame 102. In other words, linear movement of the clamp 104 along the central longitudinal axis 112 relative to the frame 102 is driven by the linear actuator 108. The linear actuator 108 enables the fastener to be installed using automatic linear movement of the clamp 104.

The linear actuator 108 may include any type of linear actuator and any associated components (e.g., linkage, etc.), such as, but not limited to, hydraulically actuated pistons, other types of hydraulic linear actuators, magnetic linear actuators, screw-type linear actuators, ball screws, lead screws, screw jacks, roller screws, linear motors, telescoping linear actuators, solenoids, servomechanisms, servomotors, hydraulic linear actuators, pneumatic linear actuators, electrical linear actuators, electromechanical linear actuators, electric motors, gears, chains, pulleys, differentials, counterweights, and/or the like. The linear actuator 108 may be actuated by any power source, such as, but not limited to, a pneumatic power source, an electric power source, a hydraulic power source, and/or the like.

The wrench 106 is mounted to the frame 102 such that the wrench 106 is configured to rotate relative to the frame 102. Specifically, the wrench 106 is configured to rotate relative to the frame 102 about the central longitudinal axis 112, as indicated by the arrows 124 and 126 in FIG. 1. As will be described below, rotation of the wrench 106 relative to the frame 102 during installation of the fastener enables the wrench 106 to rotate about the centerline axis of the fastener relative to the structure within which the fastener is being installed (and relative to the sleeve of the fastener). In the implementation shown herein, the wrench 106 is indirectly mounted to the frame 102 via the clamp 104. Specifically, the wrench 106 is mounted to the clamp 104 via one or more bearings 128 that enable the wrench 106 to rotate about the central longitudinal axis 112 relative to the clamp 104 and the frame 102. In some other implementations, the wrench 106 is mounted directly to the frame 102 (e.g., via one or more bearings, etc.) for rotation about the central longitudinal axis 112 relative to the frame 102. Although the wrench 106 is configured to rotate relative to the clamp 104, in some other implementations the clamp 104 is configured to rotate relative to the frame 102 along with the wrench 106. In the implementation shown in FIG. 1, the wrench 106 is mounted to the clamp 104 such that the wrench 106 travels with the clamp 104 longitudinally along the central longitudinal axis 112 relative to the frame 102. In other words, the wrench 106 is mounted to the frame 102 indirectly via the clamp 104 in the implementation shown in FIG. 1.

The bearing(s) 128 may include any type of bearing, such as, but not limited to, plain bearings, bushings, journal bearings, sleeve bearings, rifle bearings, composite bearings, rolling-element bearings, ball bearings, roller bearings, jewel bearings, fluid bearings, magnetic bearings, flexure bearings, and/or the like. In addition or alternatively to the bearing(s) 128, the wrench 106 is mounted to the clamp 104 and/or the frame 102 using any other mechanism, structure, and/or the like that enables the wrench 106 to rotate about the central longitudinal axis 112 relative to the frame 102, such as, but not limited to, gears, tracks, rails, pulleys, guides, cables, chains, and/or the like.

The wrench 106 is configured to grab the pintail of the pin of the fastener. When the pintail of the fastener is grabbed by the wrench 106, rotation of the wrench 106 relative to the frame 102 enables the wrench 106 to rotate the pin of the fastener about the centerline axis of the fastener relative to the sleeve of the fastener, as will be described below. The wrench 106 may include any grabbing mechanism that enables the wrench 106 to grab the pintail of the fastener such that the wrench 106 is enabled to rotate (e.g., configured to rotate, capable of rotating, etc.) the pin of the fastener about the centerline axis of the fastener relative to the sleeve of the fastener. In the implementation shown herein, the grabbing mechanism of the wrench 106 includes a socket 130 that includes a spline 132 that is configured to mesh with a spline (e.g., the spline 230 shown in FIGS. 2-4, etc.) of the pintail of the pin (i.e., the splines 132 and 230 are complementary in shape). But, in addition or alternatively to the socket 130 and/or the spline 132, the wrench 106 may include any other grabbing mechanism that enables the wrench 106 to function as described and/or illustrated herein, such as, but not limited to, flats, lobes, hexagonal structures, square structures, triangular structures, hexalobular structures, other multi-sided structures, textured surfaces, collars, collets, bands, other circular and semi-circular clamping mechanisms, dogs, jaws, other clamping mechanisms, socket having one or more of the aforementioned structures and/or the like.

Moreover, the grabbing mechanism of the wrench 106 may be configured to grab (e.g., mesh with, interlock with, etc.) any structure of the pintail of the pin that enables the wrench 106 to function as described and/or illustrated herein. In other words, the wrench 106 may be configured to grab one or more of a variety of different structures of the pintail. For example, the spline 132 of the wrench 106 is configured to mesh with the spline (e.g., the spline 230 shown in FIGS. 2-4, etc.) of the pintail. Other examples of a pintail structure that the wrench 106 may be configured to grab include, but are not limited to, flats, lobes, hexagonal structures, square structures, triangular structures, hexalobular structures, other multi-sided structures, textured surfaces, and/or the like.

The tool 100 includes the rotary actuator 110 for rotating the wrench 106. Specifically, the rotary actuator 110 is operatively connected to the wrench 106 such that the rotary actuator 110 is configured to drive (e.g., actuate, enable, allow, etc.) rotation of the wrench 106 about the central longitudinal axis 112 relative to the frame 102. In other words, rotation of the wrench 106 about the central longitudinal axis 112 relative to the frame 102 is driven by the rotary actuator 110. The rotary actuator 110 enables the fastener to be installed using automatic rotation of the wrench 106.

The rotary actuator 110 may include any type of rotary actuator and any associated components (e.g., linkage, etc.), such as, but not limited to, rotary screws, electric motors, stepper motors, servomotors, torque motors, memory wires, fluid power actuators, vacuum actuators, hydraulic rotary actuators, pneumatic rotary actuators, electrical rotary actuators, electromechanical rotary actuators, servomechanisms, gears, chains, pulleys, differentials, and/or the like. The rotary actuator 110 may be actuated by any power source, such as, but not limited to, a pneumatic power source, an electric power source, a hydraulic power source, and/or the like.

In some implementations, the tool 100 includes one or more activators 134 for manually activating the linear actuator 108 and/or one or more activators 136 for manually activating the rotary actuator 110. For example, manual selection of the activator 134 by a human operator activates the linear actuator 108 to displace (i.e., move) the clamp 104 longitudinally along the central longitudinal axis 112 of the tool 100 relative to the frame 102. In other words, manually selecting the activator 134 causes the linear actuator 108 to automatically displace the clamp 104 longitudinally along the central longitudinal axis 112 relative to the frame 102. Moreover, and for example, manual selection of the activator 136 by a human operator activates the rotary actuator 110 to rotate the wrench 106 about the central longitudinal axis 112 relative to the frame 102. In other words, manually selecting the activator 136 causes the rotary actuator 110 to automatically rotate the wrench 106 about the central longitudinal axis 112 relative to the frame 102. The activator(s) 134 and 136 each may include any type of activator, such as, but not limited to, buttons, switches, levers, knobs, and/or the like.

In addition or alternatively to the activators 134 and/or 136, the tool 100 may include and/or be communicatively coupled to one or more optional electronic devices 138 that control activation of the linear actuator 108 and/or the rotary actuator 110. The electronic device 138 includes one or more processors 140 and one or more optional memories 142. In some implementations, the electronic device 138 is configured to execute some or all of the operations (e.g., activation of a linear actuator, activation of a rotary actuator, etc.) of the methods described herein with respect to FIGS. 6 and 7 for installing a fastener. In some implementations, the electronic device 138 controls positioning of the tool 100 at the intended location of the structure within which the fastener is being installed. In some other implementations, the tool 100 is manually positioned at the installation location by a human operator.

The electronic device 138 represents any device executing instructions (e.g., as application programs/software, operating system functionality, or both) to implement the operations and functionality associated with the electronic device 138. In some implementations, the electronic device 138 includes a mobile electronic device or any other portable device, for example a mobile telephone, laptop, tablet, computing pad, netbook, and/or the like. In some implementations, the electronic device 138 includes less portable devices, for example desktop personal computers, servers, controllers, kiosks, tabletop devices, industrial control devices, and/or the like. The electronic device 138 represents a group of processing units, servers, other computing devices, and/or the like in some implementations.

In some implementations, the electronic device 138 is located onboard the tool 100, while in other implementations the electronic device 138 is located offboard the tool 100 (e.g., at the site of a larger system within which the tool 100 is implemented, at a site remote from a larger system within which the tool 100 is implemented, etc.). In some implementations, a sensing apparatus (not shown; e.g., a feedback control loop, etc.) guides the tool 100 to provide alignment of the wrench 106 with the fastener.

Figure 2:
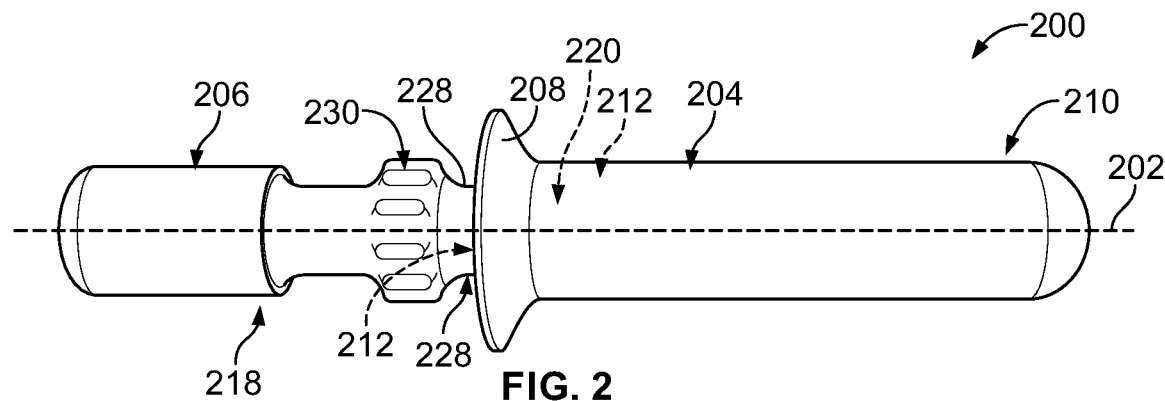
FIG. 2 is a perspective view illustrating a fastener that can be installed using the tool shown in FIG. 1.
Figure 3:
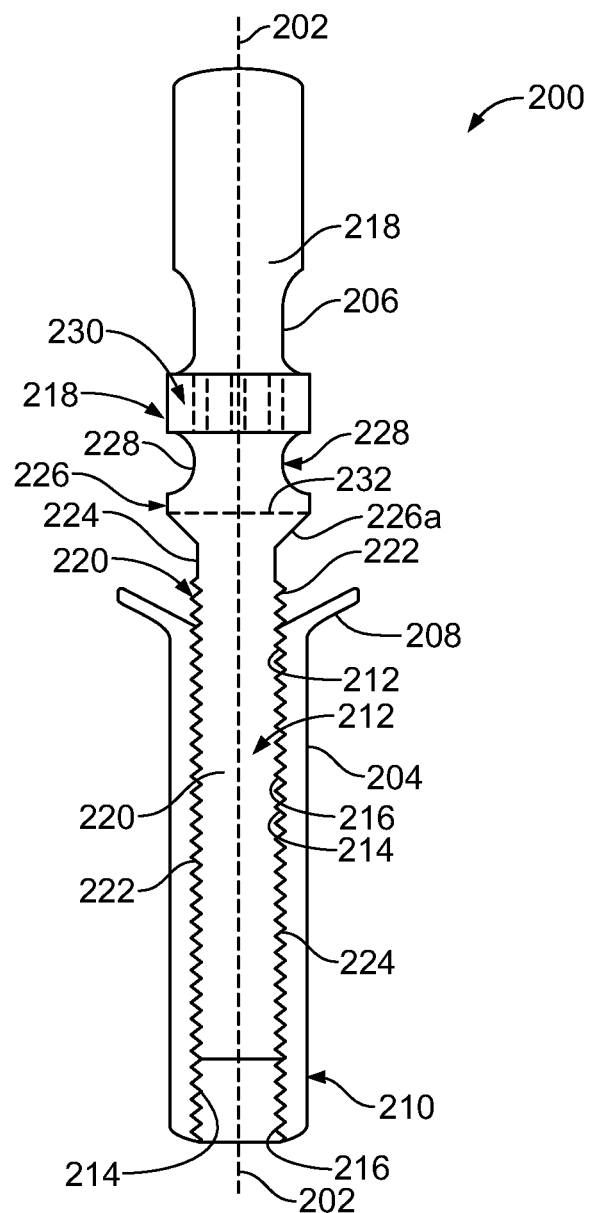
FIG. 3 is a cross-sectional view illustrating the fastener shown in FIG. 2.

FIGS. 2 and 3 illustrate a fastener 200 that can be installed using the tool 100 (FIGS. 1 and 4). The fastener 200 is meant solely as one non-limiting example of a fastener with which the tool 100 may be used to install. Accordingly, the tool 100 is not limited to being used to install the fastener 200, but rather the tool 100 may be used to install fasteners having other sizes, shapes, geometries, and/or the like.

The fastener 200 extends a length along a centerline axis 202 and includes a sleeve 204 and a pin 206 that is threadably received into the sleeve 204. The sleeve 204 extends a length along the centerline axis 202 from a flange 208 of the sleeve 204 to a tail 210 of the sleeve 204. The sleeve 204 includes an opening 212 that extends through the length of the sleeve 204. The opening 212 of the sleeve 204 is threaded along at least a portion of the length thereof. In other words, the sleeve 204 includes one or more threads 214 (not visible in FIG. 2) that extend into an interior surface 216 (not visible in FIG. 2) of the sleeve 204 that defines the opening 212. As will be described in more detail below, the tail 210 of the sleeve 204 is configured to be deformed radially outward relative to the centerline axis 202 during installation of the fastener 200.

The pin 206 extends a length along the centerline axis 202. The pin 206 includes a pintail 218 and a shaft 220 that extends outward from the pintail 218 along the centerline axis 202. The shaft 220 of the pin 206 is threaded along at least a portion of the length thereof such that the shaft 220 is configured to be threadably received into the sleeve 204. Specifically, the shaft 220 includes one or more threads 222 (not visible in FIG. 2) that extend into an exterior surface 224 (not visible in FIG. 2) of shaft 220. The threads 222 enable the shaft 220 to be threadably received into the opening 212 of the sleeve 204.

The pintail 218 of the pin 206 includes a flange 226 (not visible in FIG. 2). The flange 226 has a complementary shape relative to the flange 208 of the sleeve 204 such that the flange 226 of the pintail 218 is configured to seat with (e.g., against, etc.) the flange 208 of the sleeve 204. The pintail 218 of the pin 206 includes a neck 228 and a spline 230. As will be described in more detail below, the clamp 104 (FIGS. 1 and 4) of the tool 100 is configured to grab the neck 228 of the pintail 218 and the wrench 106 (FIGS. 1 and 4) of the tool 100 is configured to mesh with the spline 230 of the pintail 218 during installation of the fastener 200.

The pintail 218 of the pin 206 is frangible such that the pintail 218 of the pin 206 is configured to break from the shaft 220 of the pin 206 during installation of the fastener 200. Specifically, the pintail 218 of the pin 206 is configured to shear from the shaft 220 of the pin 206 when a predetermined amount of torque is applied to the pin 206 while the flange 226 of the pintail 218 is seated with the flange 208 of the sleeve 204. For example, the pintail 218 of the pin 206 may be configured to break from the shaft 220 of the pin 206 along a shear line 232 (not visible in FIG. 2). A portion of the pintail 218 remains with the shaft 220 after the pintail 218 has broken from the shaft 220. For example, a tapered segment 226a of the flange 226 may remain with the shaft 220 after the pintail 218 has sheared from the shaft 220, as is shown in the example of FIG. 4f.

Operation of the tool 100 to install the fastener 200 within an opening 252 of a structure 250 will now be described with reference to FIGS. 4a-4f. As illustrated in FIG. 4a, the opening 252 of the structure 250 includes a countersink 254 along a front side 262 of the structure 250. The flange 208 of the sleeve 204 and the countersink 254 are complementary in shape to enable the flange 208 to seat within the countersink 254. Although the opening 252 shown herein has a cylindrical (i.e., circular cross-sectional) shape, the tool 100 is not limited to installing fasteners into cylindrical openings, but rather may be used to install fasteners into openings that include any other shape in addition or alternative to a cylindrical shape.

Figure 4B:
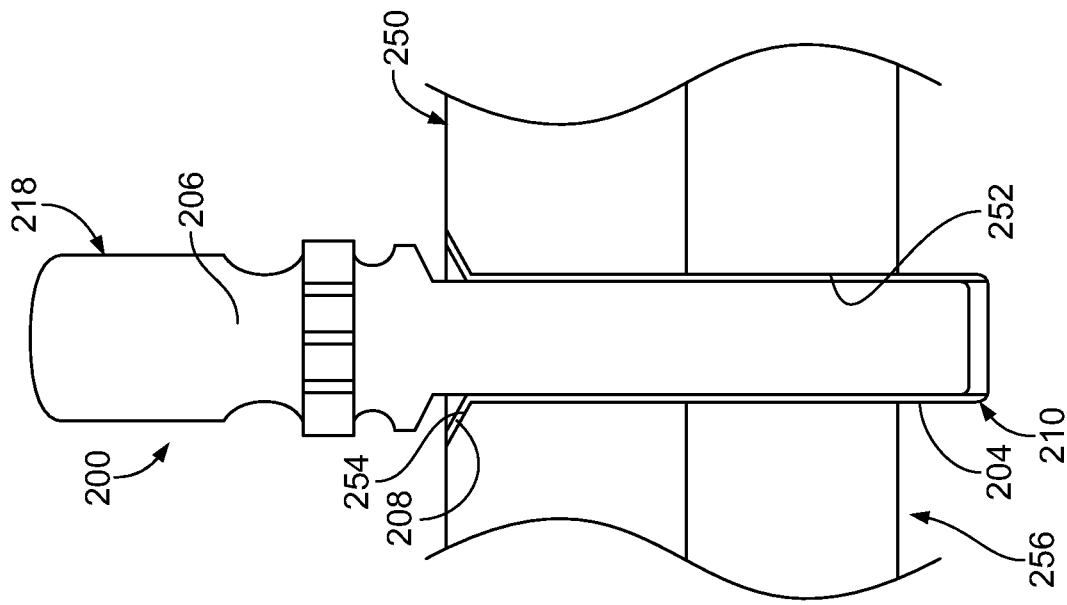
FIGS. 4a-4f are cross-sectional schematic diagrams illustrating installation of the fastener shown in FIGS. 2 and 3 using the tool shown in FIG. 1.
Figure 4A:
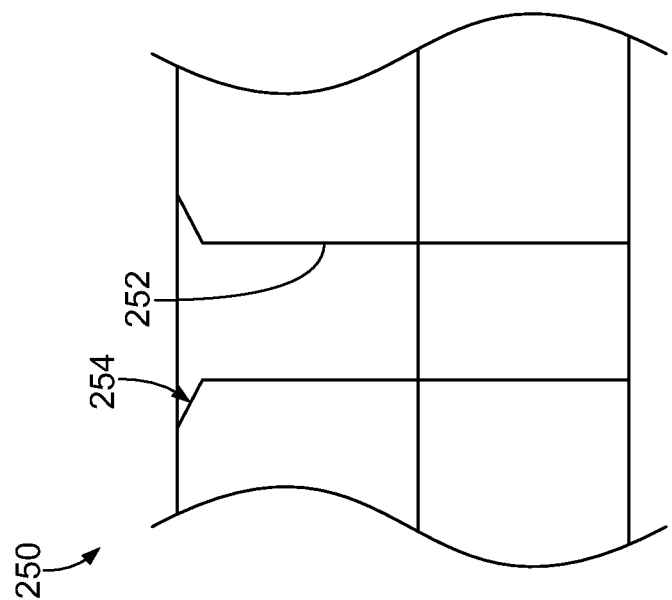

To install the fastener 200 within the structure 250, the fastener 200 is inserted into the opening 252 such that the tail 210 of the sleeve 204 of the fastener 200 extends outward along a back side 256 (i.e., opposite the front side 262) of the structure 250 and such that the flange 208 of the sleeve 204 is seated within the countersink 254 of the opening 252, as is shown in FIG. 4b. In some implementations, the fastener 200 has a clearance fit within the opening 252, wherein the fastener 200 can be inserted into the opening 252 manually (e.g., by a human operator, etc.) or automatically (e.g., using one or more other devices such as, but not limited to, a robotic arm or other robotic device, the electronic device 138, and/or the like) using relatively little force. In some other implementations, the fastener 200 has an interference (e.g., transition, etc.) fit within the opening 252, wherein the fastener 200 is forced, pushed, hammered, and/or riveted into the opening 252, for example manually (e.g., by a human operator, etc.) or automatically (e.g., using one or more other devices such as, but not limited to, a robotic arm or other robotic device, the electronic device 138, and/or the like).

Figure 4C:
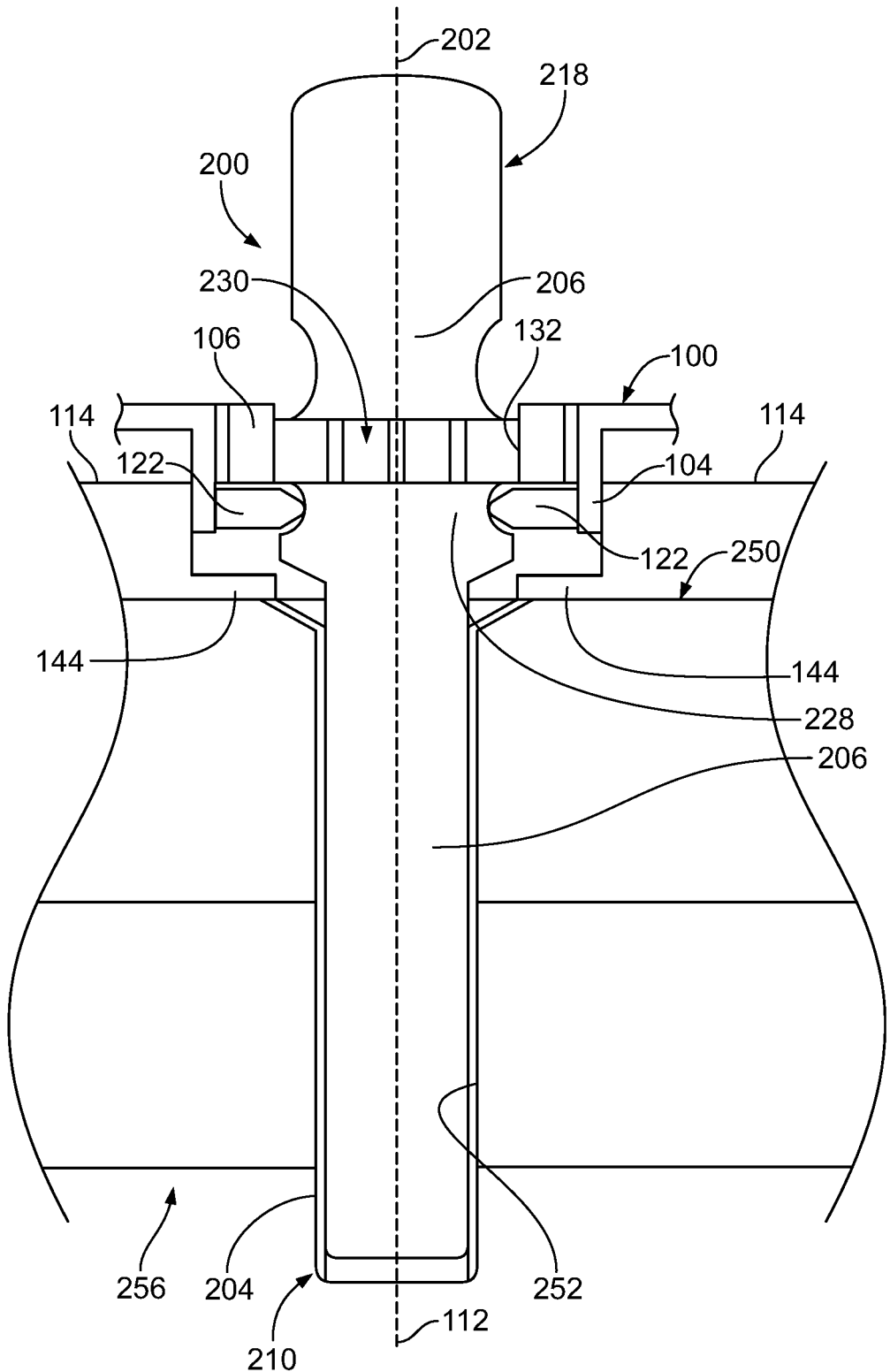

Once the fastener 200 is received (e.g., seated, etc.) within the opening 252, the tool 100 is positioned over the fastener 200 such that the clamp 104 extends around the neck 228 of the pintail 218 and such that the spline 132 of the wrench 106 is meshed with the spline 230 of the pintail 218, as shown in FIG. 4c. The linear actuator 108 (FIGS. 1 and 4d) and the rotary actuator 110 (FIGS. 1 and 4e) are not shown in FIG. 4c for clarity. The clamp 104 of the tool 100 is then clamped to the pintail 218 of the fastener. Specifically, the jaws 122 of the clamp 104 are moved radially inward toward the axes 112 and 202 to thereby grab the neck 228 of the pintail 218. In some other implementations, the fastener 200 is first inserted (i.e., loaded) into the tool 100 (e.g., manually by a human operator, automatically via the tool 100 grabbing the fastener 200 from a source of the fasteners 200, etc.) and thereafter inserted into the opening 252 using the tool 100 (i.e., while being held by the tool 100). As is shown in FIG. 4c, the centerline axis 202 of the fastener 200 extends parallel and co-linear with the central longitudinal axis 112 of the tool 100 when the fastener 200 is held by the tool 100.

Figure 4D:
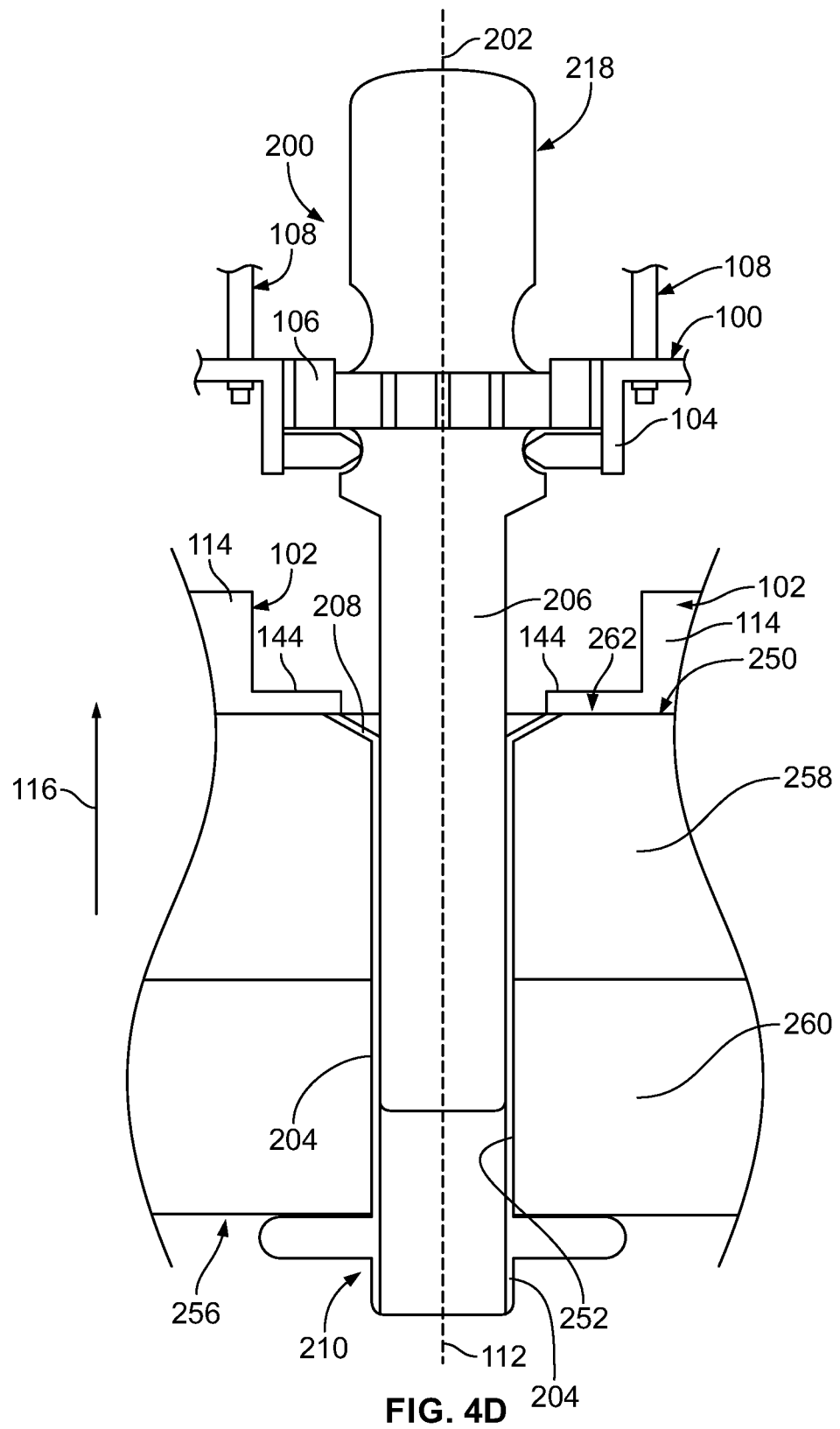

Installation of the fastener 200 further includes deforming the tail 210 of the sleeve 204 radially outward relative to the centerline axis 202 of the fastener 200. The tail 210 is deformed by activating the linear actuator 108 to displace the clamp 104 longitudinally along the axes 112 and 202 relative to the structure 250 in the direction 116 such that the pin 206 of the fastener 200 is displaced longitudinally along the centerline axis 202 relative to the sleeve 204 in the direction 116, as shown in FIG. 4d. In other words, deforming the tail 210 radially outward relative to the centerline axis 202 includes automatically displacing the pin 206 longitudinally along the centerline axis 202 relative to the sleeve 204 using the linear actuator 108. As can be seen in FIG. 4d, the deformation of the tail 210 of the sleeve 204 radially outward relative to the centerline axis 202 expands the size of the tail 210 along the back side 256 of the structure 250. The expanded tail 210 forms a retention feature that cooperates with the flange 208 of the sleeve 204 to hold the fastener 200 within the opening 252 (and thereby fasten two segments 258 and 260 of the structure 250 together). The rotary actuator 110 is not shown in FIG. 4d for clarity.

In the exemplary implementation of the tool 100, the base 114 of the frame 102 of the tool 100 includes one or more legs 144 that extend over and engage with the flange 208 of the sleeve 204 and the front side 262 of the structure 250. Accordingly, the base 114 is braced against the front side 262 of the structure 250 and against the flange 208 of the sleeve 204 as the clamp 104 moves the pin 206 longitudinally along the centerline axis 202 relative to the sleeve 204. Although the linear actuator 108 and the clamp 104 are shown in the illustrated implementation as pulling on the pin 206 of the fastener to move the pin 206 longitudinally along the centerline axis 202 relative to the sleeve 204, additionally or alternatively the linear actuator 108 and the clamp 104 may move the pin 206 longitudinally along the centerline axis 202 relative to the sleeve 204 by pushing on the pin 206.

Figure 4E:
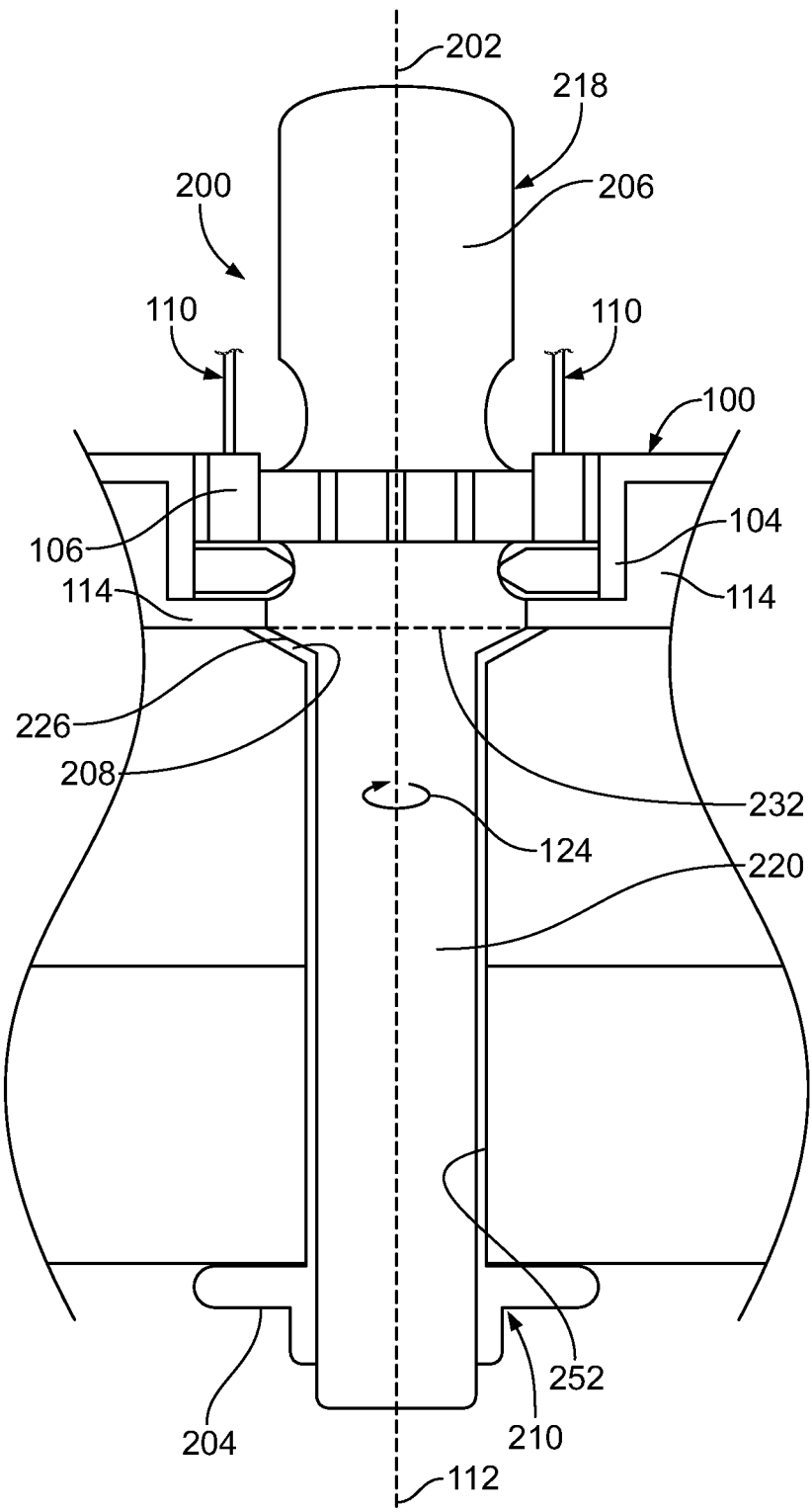
Figure 4F:
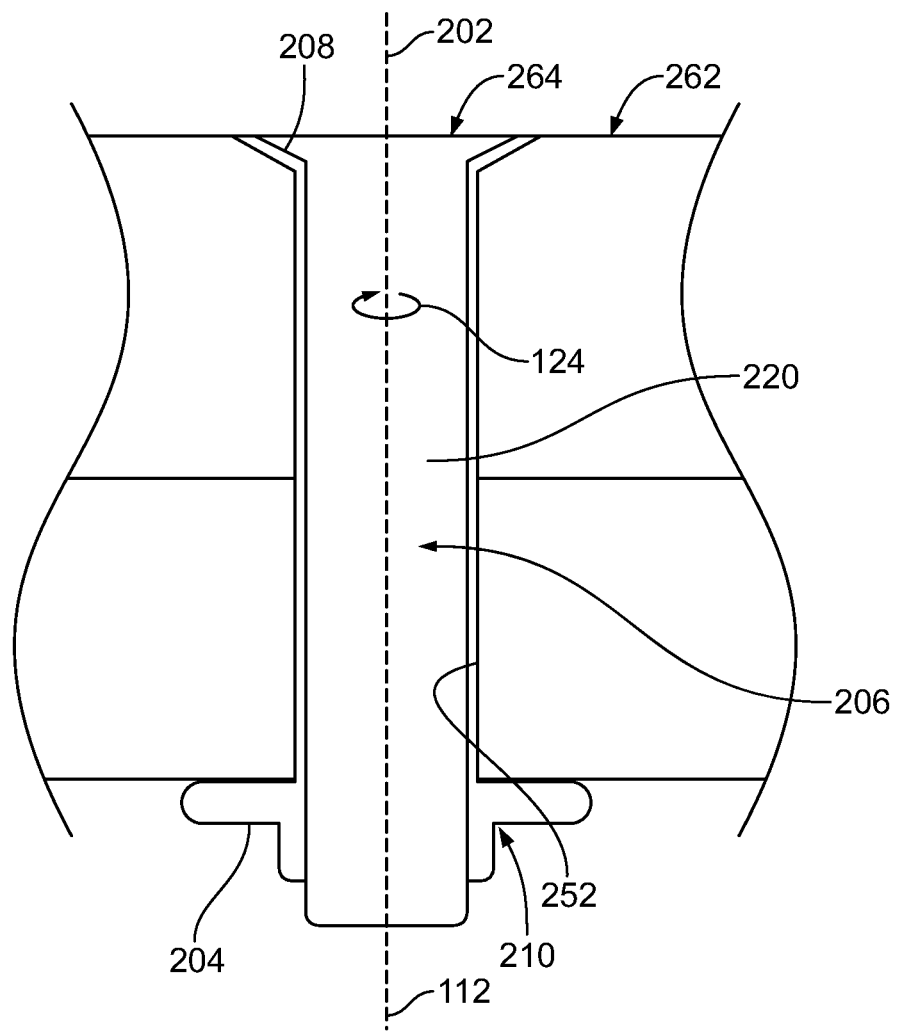

Referring now to FIGS. 4e and 4f, installation of the fastener 200 further includes rotationally shearing the pintail 218 of the pin 206 from the shaft 220 of the pin 206. Optionally, installation of the fastener 200 includes waiting a predetermined amount of time (e.g., one second, five seconds, ten seconds, thirty seconds, etc.) after deforming the tail 210 of the sleeve 204 radially outward before rotationally shearing the pintail 218 from the shaft 220 of the pin 206. The linear actuator 108 is not shown in FIG. 4e for clarity. In other words, some implementations of the tool 100 are configured to include a delay between deforming the tail 210 radially outward and rotationally shearing the pintail 218 from the shaft 220. In some implementations, the tool 100 is configured such that the amount of the delay (i.e., the predetermined amount of time) is adjustable, which may increase the flexibility of the tool 100, allow for improvement of the tool 100, and/or enable adjustment of the tool 100 for different fastener diameters.

The pintail 218 is rotationally sheared from the pin shaft 220 by activating the rotary actuator 110 to rotate the wrench 106 of the tool 100 about the axes 112 and 202 (e.g., in the direction 124, etc.) such that the pin 206 of the fastener 200 is rotated about the centerline axis 202 relative to the sleeve 204 of the fastener 200. In other words, rotationally shearing the pintail 218 from the shaft 220 includes automatically rotating the pin 206 about the centerline axis 202 relative to the sleeve 204 using the rotary actuator 110. As shown in FIG. 4e, rotation of the pin 206 relative to the sleeve 204 threads the shaft 220 of the pin 206 further into the sleeve 204 from the position shown in FIG. 4d until the flange 226 of the pintail 218 seats within (e.g., against, etc.) the flange 208 of the sleeve 204. Further rotation of the pin 206 about the centerline axis 202 relative to the sleeve 204 from the position shown in FIG. 4e breaks the pintail 218 of the pin 206 from the shaft 220 of the pin 206 (e.g., along the shear line 232, etc.), as is shown in FIG. 4f. In other words, rotationally shearing the pintail 218 from the shaft 220 includes rotating the pin 206 relative to the sleeve 204 until the pintail 218 breaks from the shaft 220 of the pin 206.

Optionally, the pintail 218 is rotationally sheared from the shaft 220 such that a broken end portion 264 of the shaft 220 is approximately flush with the front side 262 of the structure 250 and/or the flange 208 of the sleeve 204, for example as is shown in FIG. 4f. In other implementations, the broken end portion 264 of the shaft 220 extends above and/or below (as viewed in FIG. 4f) the front side 262 and/or the flange 208.

Figure 5:
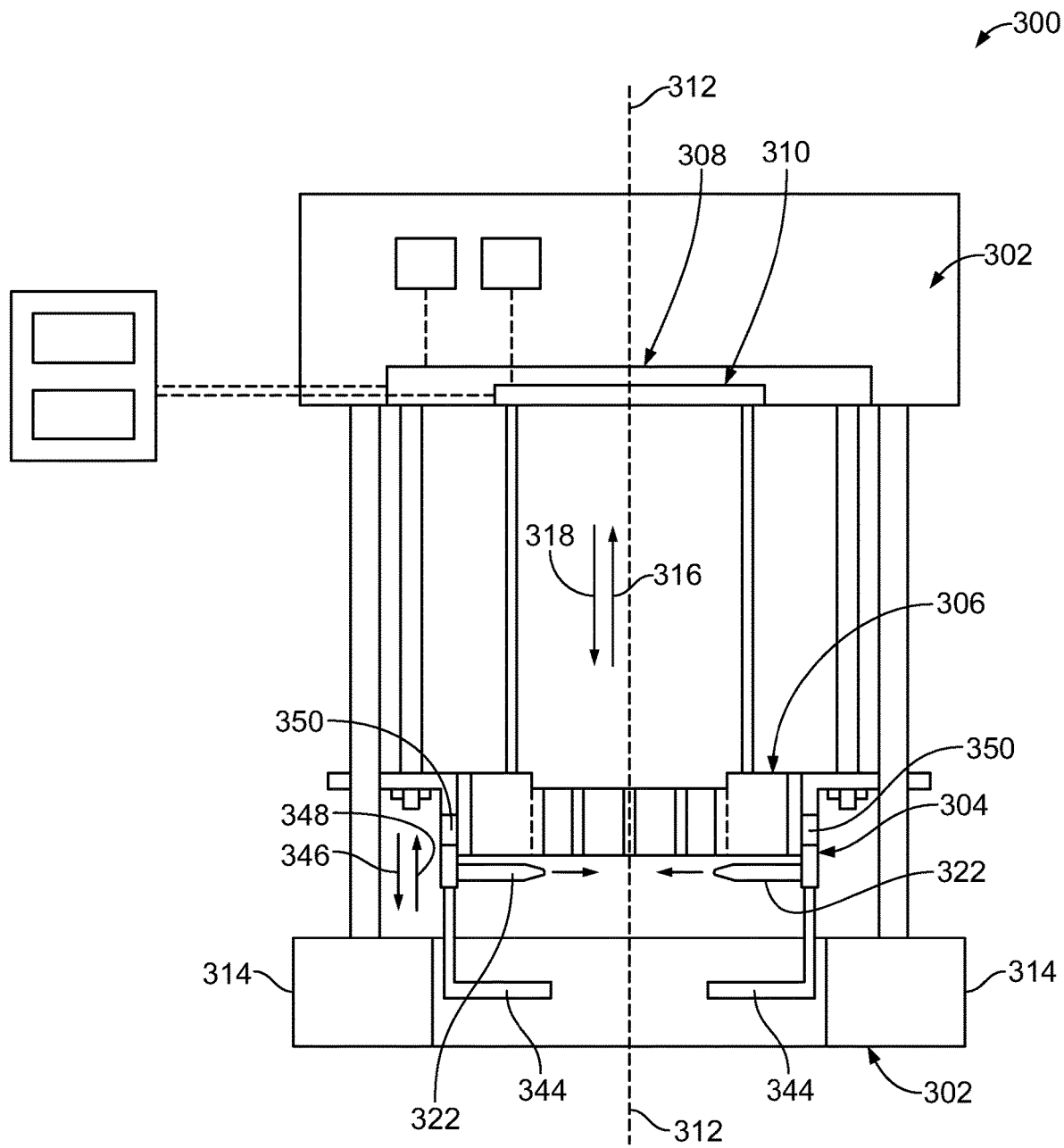
FIG. 5 is a cross-sectional schematic diagram illustrating a tool for installing a fastener according to another implementation.

FIG. 5 illustrates another implementation of a tool 300 for installing a fastener (e.g., the fastener 200 shown in FIGS. 2-4, etc.). The tool 300 includes a frame 302, a clamp 304 mounted to the frame 302, a wrench 306 mounted to the frame 302, a linear actuator 308, and a rotary actuator 310. The clamp 304 is configured to move longitudinally relative to the frame 302, and the wrench 306 is configured to rotate relative to the frame 302. Linear movement of the clamp 304 relative to the frame 302 is driven by the linear actuator 308. Rotation of the wrench 306 relative to the frame 302 is driven by the rotary actuator 310. The linear actuator 308 and the rotary actuator 310 enable the fastener to be installed using automatic linear movement of the clamp 304 and automatic rotation of the wrench 306, respectively.

The tool 300 is configured to automatically insert a fastener into an opening (e.g., the opening 252 shown in FIG. 4, etc.) with an interference fit. In other words, the tool 300 is configured to install the fastener into an opening that has an interference fit with the fastener. The clamp 304 of the tool 300 includes one or more legs 344 configured to engage the flange (e.g., the flange 208 shown in FIGS. 2-4, etc.) of the sleeve (e.g., the sleeve 204 shown in FIGS. 2-4, etc.) when the fastener is held by the tool 300. For example, the legs 344 of the tool 300 are configured to engage the flange of the sleeve in a substantially similar manner to how the legs 144 of the base 114 of the tool 100 are shown engaging the flange 208 of the sleeve 204 in FIG. 4c.

The legs 344 of the clamp 304 are configured to move longitudinally relative to jaws 322 of the clamp 304 along a central longitudinal axis 312 of the tool 300, as indicated by the arrows 346 and 348 in FIG. 5. In other words, the legs 344 are configured to be extended outwardly away from the jaws 322 in the direction 346 and retracted inwardly toward the jaws 322 in the direction 348. Relative movement between the legs 344 and the jaws 322 of the clamp 304 enables adjustment of the position of the legs 344 along the central longitudinal axis 312 relative to the position of the jaws 322, for example to accommodate the different positions of the pin (e.g., the pin 206 shown in FIGS. 2-4, etc.) of the fastener relative to the sleeve of the fastener during different stages of the installation process. The tool 300 may include a linear actuator 350 that is operatively connected to the legs 344 such that the linear actuator 350 is configured to drive (e.g., actuate, enable, allow, etc.) linear movement of the legs 344 relative to the jaws 322 along the central longitudinal axis 312.

The linear actuator 350 may include any type of linear actuator and any associated components (e.g., linkage, etc.), such as, but not limited to, hydraulically actuated pistons, other types of hydraulic linear actuators, magnetic linear actuators, screw-type linear actuators, ball screws, lead screws, screw jacks, roller screws, linear motors, telescoping linear actuators, solenoids, servomechanisms, servomotors, hydraulic linear actuators, pneumatic linear actuators, electrical linear actuators, electromechanical linear actuators, electric motors, gears, chains, pulleys, differentials, counterweights, and/or the like. The linear actuator 350 may be actuated by any power source, such as, but not limited to, a pneumatic power source, an electric power source, a hydraulic power source, and/or the like.

To automatically insert the fastener into an opening with an interference fit, the fastener is first inserted (i.e., loaded) into the tool 300 (e.g., manually by a human operator, automatically via the tool 300 grabbing the fastener from a source thereof, etc.). The linear actuator 350 may adjust the position of the legs 344 relative to the jaws 322 to enable the tool 300 to hold the fastener such that the legs 344 are engaged with the flange of the sleeve of the fastener while the jaws 322 are engaged with a neck (e.g., the neck 228 shown in FIGS. 2-4, etc.) of a pintail (e.g., the pintail 218 shown in FIGS. 2-4, etc.) of the fastener. The tool 300 is then positioned at the installation location (i.e., over the opening) such that a base 314 of the frame 302 is braced against a front side (e.g., the front side 262 of the structure 250 shown in FIG. 4, etc.). The linear actuator 308 is then activated to move the clamp 304 longitudinally along the central longitudinal axis 312 relative to the base 114 and the structure (e.g., the structure 250 shown in FIG. 4, etc.) in the direction of the arrow 318. The legs 344 of the clamp 304 are locked in position (e.g., using the linear actuator 350, etc.) relative to the jaws 322 of the clamp 304 as the clamp 304 moves longitudinally along the axis 312 in the direction 318 toward the structure such that the legs 344 move toward the structure along with the jaws 322. Accordingly, as the clamp 304 moves longitudinally along the axis 312 in the direction 318 toward the structure, the engagement between the legs 344 and the flange of the fastener sleeve forcibly inserts the fastener into the opening until the flange of the sleeve is seated within a seat (e.g., the countersink 254 shown in FIG. 4, etc.) of the opening. The clamp 304 of the tool 300 thus enables the fastener to be automatically inserted into an opening with an interference fit.

Once the fastener has been automatically inserted into the opening with the interference fit, the remainder of the installation process can be performed to complete installation of the fastener. During the remaining steps of the installation process, relative movement between the legs 344 and the jaws 322 of the clamp 304 can be used to accommodate movement to the different relative positions between the pin and the sleeve of the fastener. For example, the linear actuator 350 may control extension of the legs 344 away from the jaws 322 (i.e., in the direction 346) as the clamp 304 moves in the direction of the arrow 316 to form the retention feature (e.g., the expanded tail 210 shown in FIGS. 4e-4f, etc.) of the fastener. The extension of the legs 344 as the jaws 322 move away from the structure maintains the engagement between the legs 344 and the flange of the sleeve to enable the legs 344 to brace against the sleeve flange as the pin of the fastener is moved relative to the sleeve to form the retention feature. Moreover, and for example, the linear actuator 350 may control retraction of the legs 344 toward the jaws 322 (i.e., in the direction 348) as the pin of the fastener is rotated to seat a flange (e.g., the flange 226 shown in FIGS. 2-4, etc.) of the pintail of the pin within the flange of the sleeve.

Figure 6:
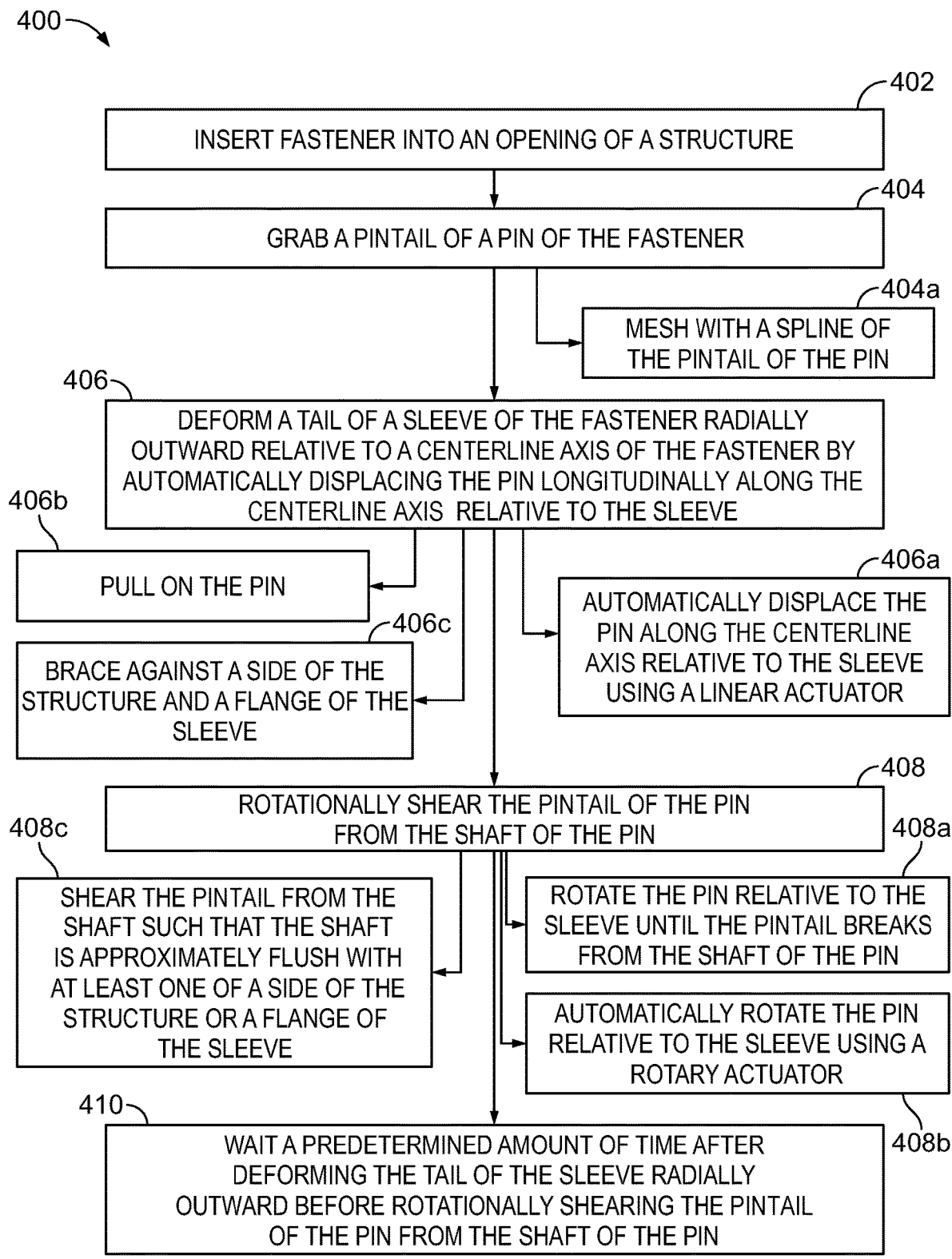
FIG. 6 is a flow chart illustrating a method for installing a fastener into an opening of a structure according to an implementation.

FIG. 6 is a flow chart illustrating a method 400 for installing a fastener (e.g., the fastener 200 shown in FIGS. 2-4, etc.) into an opening (e.g., the opening 252 shown in FIG. 4, etc.) of a structure (e.g., the structure 250 shown in FIG. 4, etc.) according to an implementation. The fastener includes a sleeve (e.g., the sleeve 204 shown in FIGS. 2-4, etc.) and a pin (e.g., the pin 206 shown in FIGS. 2-4, etc.) threadably received into the sleeve. The method 400 includes inserting, at 402, the fastener into the opening of the structure. At 404, the method 400 includes grabbing a pintail of the pin. In some implementations, grabbing at 404 the pintail of the pin includes meshing, at 404a, with a spline of the pintail of the pin.

The method 400 includes deforming, at 406, a tail of the sleeve radially outward relative to a centerline axis of the fastener by automatically displacing the pin longitudinally along the centerline axis relative to the sleeve. In some implementations, deforming at 406 the tail of the sleeve radially outward by automatically displacing the pin relative to the sleeve along the centerline axis includes automatically displacing, at 406a, the pin along the centerline axis relative to the sleeve using a linear actuator (e.g., the linear actuator 108 shown in FIGS. 1 and 4, the linear actuator 308 shown in FIG. 5, etc.). Moreover, some implementations of deforming at 406 the tail of the sleeve radially outward by automatically displacing the pin relative to the sleeve along the centerline axis include pulling, at 406b, on the pin. Optionally, deforming at 406 the tail of the sleeve radially outward by automatically displacing the pin relative to the sleeve along the centerline axis includes bracing, at 406c, against a side of the structure and a flange of the sleeve.

At 408, the method 400 includes rotationally shearing the pintail of the pin from a shaft of the pin. In some implementations, rotationally shearing at 408 the pintail of the pin from the shaft of the pin includes rotating, at 408a, the pin relative to the sleeve until the pintail of the pin breaks from the shaft of the pin. In some implementations, rotationally shearing at 408 the pintail of the pin from the shaft of the pin includes automatically rotating, at 408b, the pin relative to the sleeve using a rotary actuator (e.g., the rotary actuator 110 shown in FIGS. 1 and 4, the rotary actuator 310 shown in FIG. 5, etc.). Optionally, rotationally shearing at 408 the pintail of the pin from the shaft of the pin includes shearing, at 408c, the pintail from the shaft such that the shaft is approximately flush with at least one of a side of the structure or a flange of the sleeve.

Some implementations of the method 400 further include waiting, at 410, a predetermined amount of time after deforming the tail of the sleeve radially outward before rotationally shearing the pintail of the pin from the shaft of the pin.

Figure 7:
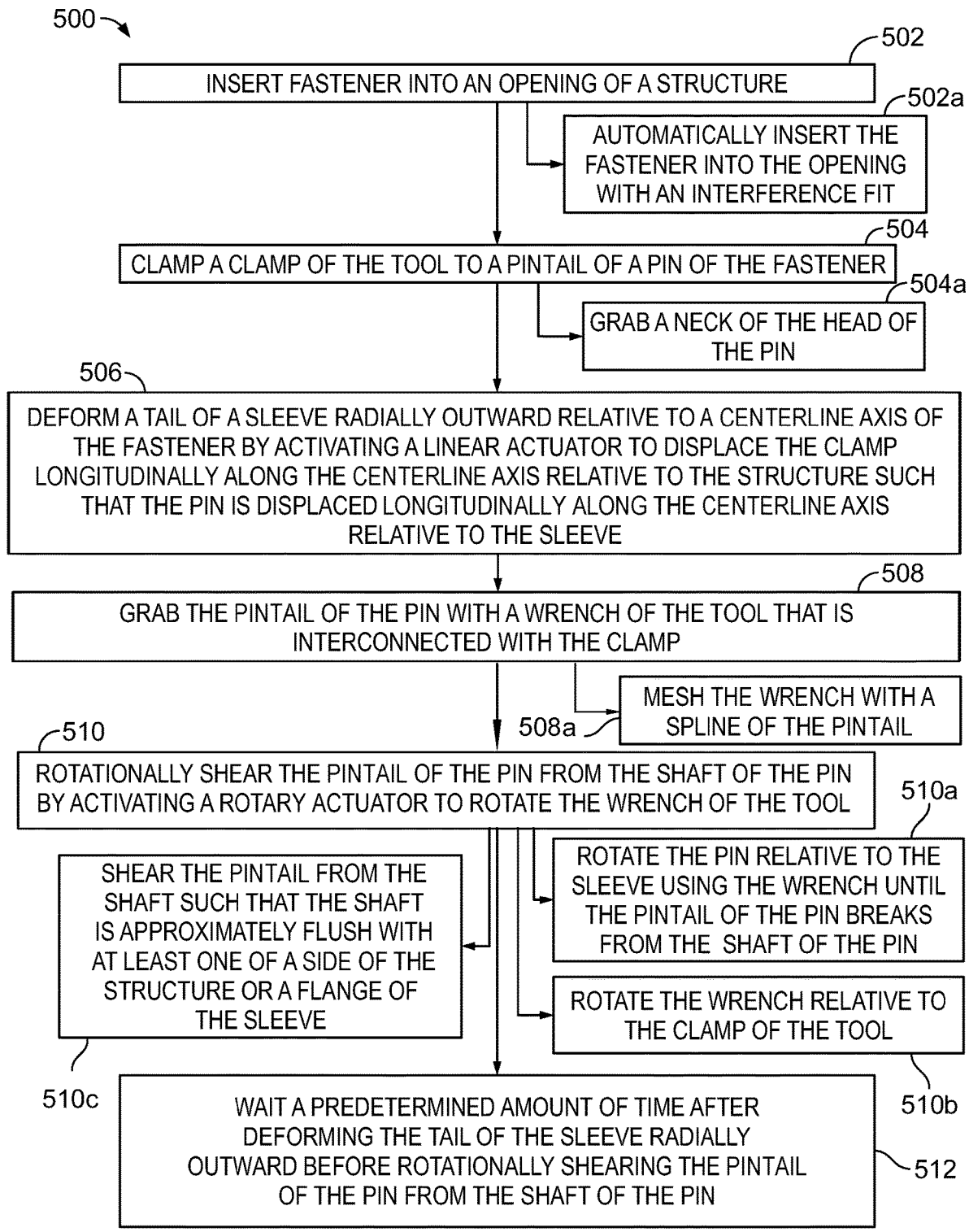
FIG. 7 is a flow chart illustrating a method for installing a fastener into an opening of a structure using a tool according to an implementation.

FIG. 7 is a flow chart illustrating a method 500 for installing a fastener (e.g., the fastener 200 shown in FIGS. 2-4, etc.) into an opening (e.g., the opening 252 shown in FIG. 4, etc.) of a structure (e.g., the structure 250 shown in FIG. 4, etc.) using a tool (e.g., the tool 100 shown in FIGS. 1 and 4, the tool 300 shown in FIG. 5, etc.) according to an implementation. The fastener includes a sleeve (e.g., the sleeve 204 shown in FIGS. 2-4, etc.) and a pin (e.g., the pin 206 shown in FIGS. 2-4, etc.) threadably received into the sleeve. The method 500 includes inserting, at 502, the fastener into the opening of the structure. In some implementations, inserting at 502 the fastener into the opening of the structure includes automatically inserting, at 502a, the fastener into the opening with an interference fit. At 504, the method 500 includes clamping a clamp of the tool to a pintail of the pin. In some implementations, clamping at 504 the clamp of the tool to the pintail of the pin includes grabbing, at 504a, a neck of the pintail of the pin.

At 506, the method 500 includes deforming a tail of the sleeve radially outward relative to a centerline axis of the fastener by activating a linear actuator (e.g., the linear actuator 108 shown in FIGS. 1 and 4, the linear actuator 308 shown in FIG. 5, etc.) to displace the clamp longitudinally along the centerline axis relative to the structure such that the pin is displaced longitudinally along the centerline axis relative to the sleeve.

At 508, the method 500 includes grabbing the pintail of the pin with a wrench of the tool that is interconnected with the clamp. In some implementations, grabbing at 508 the pintail of the pin with the wrench of the tool includes meshing, at 508a, the wrench with a spline of the pintail of the pin.

The method 500 includes rotationally shearing, at 510, the pintail of the pin from a shaft of the pin by activating a rotary actuator (e.g., the rotary actuator 110 shown in FIGS. 1 and 4, the rotary actuator 310 shown in FIG. 5, etc.) to rotate the wrench of the tool. In some implementations, rotationally shearing at 510 the pintail of the pin from the shaft of the pin includes rotating, at 510a, the pin relative to the sleeve using the wrench until the pintail of the pin breaks from the shaft of the pin. Optionally, rotationally shearing at 510 the pintail of the pin from the shaft of the pin includes rotating, at 510b, the wrench relative to the clamp of the tool. Rotationally shearing at 510 the pintail of the pin from the shaft of the pin optionally includes shearing, at 510c, the pintail from the shaft such that the shaft is approximately flush with at least one of a side of the structure or a flange of the sleeve.

Some implementations of the method 500 further include waiting, at 512, a predetermined amount of time after deforming the tail of the sleeve radially outward before rotationally shearing the pintail of the pin from the shaft of the pin.

Figure 8:
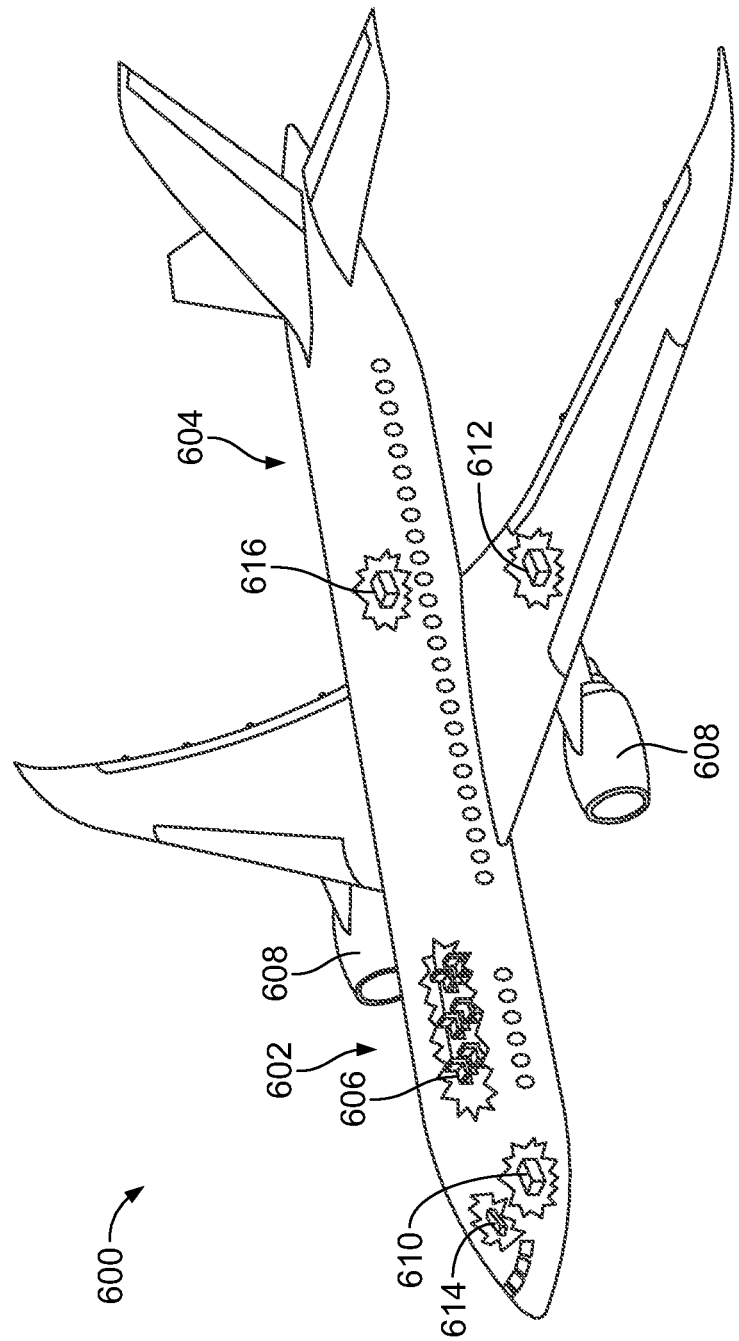
FIG. 8 is a schematic view of an implementation of an aircraft.

Referring now to FIG. 8, examples of the disclosure may be described in the context of using the methods and tools disclosed herein to build and/or service (e.g., maintenance, inspection, modification, reconfiguration, refurbishment, repair, replacement, etc.) one or more portions of an aircraft 600 that includes an airframe 602 with a plurality of high-level systems 604 and an interior 606. Examples of high-level systems 604 include one or more of a propulsion system 608, an electrical system 610, a hydraulic fluid system 612, a control system 614, and an environmental system 616. Any number of other systems can be included. Although a fixed wing passenger aircraft is shown, the methods and tools disclosed herein can be used with any other type of aircraft, such as, but not limited to, transport aircraft, military aircraft, rotorcraft (e.g., helicopters, etc.), lighter than air vehicles (e.g., balloons, etc.), and/or the like. Moreover, although an aerospace example is shown, the principles can be applied to other industries, such as, but not limited to, the automotive industry, the marine industry, and/or the like.

Figure 9:
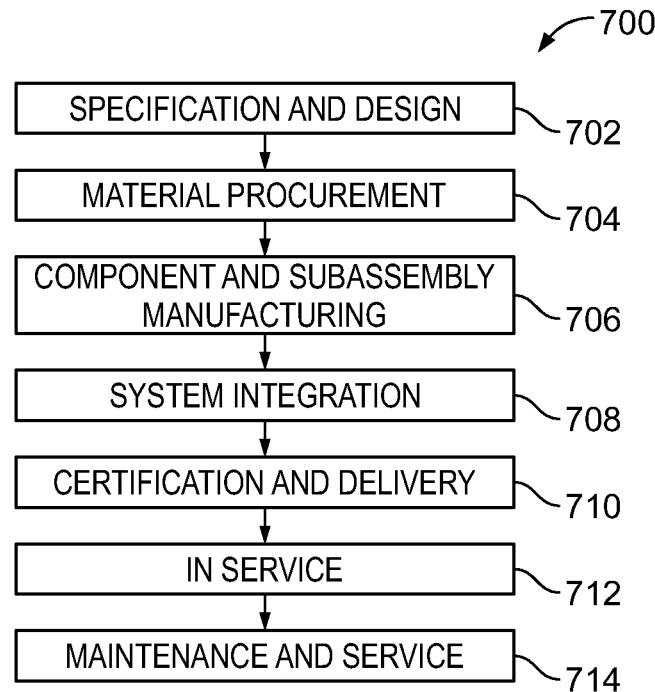
FIG. 9 is a block diagram of an implementation of an aircraft production and service methodology.

Examples of the disclosure can be described in the context of an aircraft manufacturing and service method 700 as shown in FIG. 9. During pre-production, illustrative method 700 can include specification and design 702 of an aircraft (e.g., the aircraft 600 shown in FIG. 8, etc.) and material procurement 704. During production, component and sub-assembly manufacturing 406 and system integration 708 of the aircraft take place. Thereafter, the aircraft can go through certification and delivery 710 to be placed in service 712. While in service by a customer, the aircraft is scheduled for routine maintenance and service 714 (which can also include inspection, modification, reconfiguration, refurbishment, repair, replacement, and so on). For example, the operating environment of the methods and tools disclosed herein may include a fuel tank, a wing, a fuselage, and/or the like of an aircraft and one or more of the methods and/or tools disclosed herein may be used therein to service one or more components of the aircraft therein.

Each of the processes of the illustrative method 700 can be performed or carried out by a system integrator, a third party, and/or an operator (e.g., a customer, etc.). For the purposes of this description, a system integrator can include, without limitation, any number of aircraft manufacturers and major-system subcontractors; a third party can include, without limitation, any number of vendors, subcontractors, and suppliers; and an operator can be an airline, leasing company, military entity, service organization, and so on.

Figure 10:
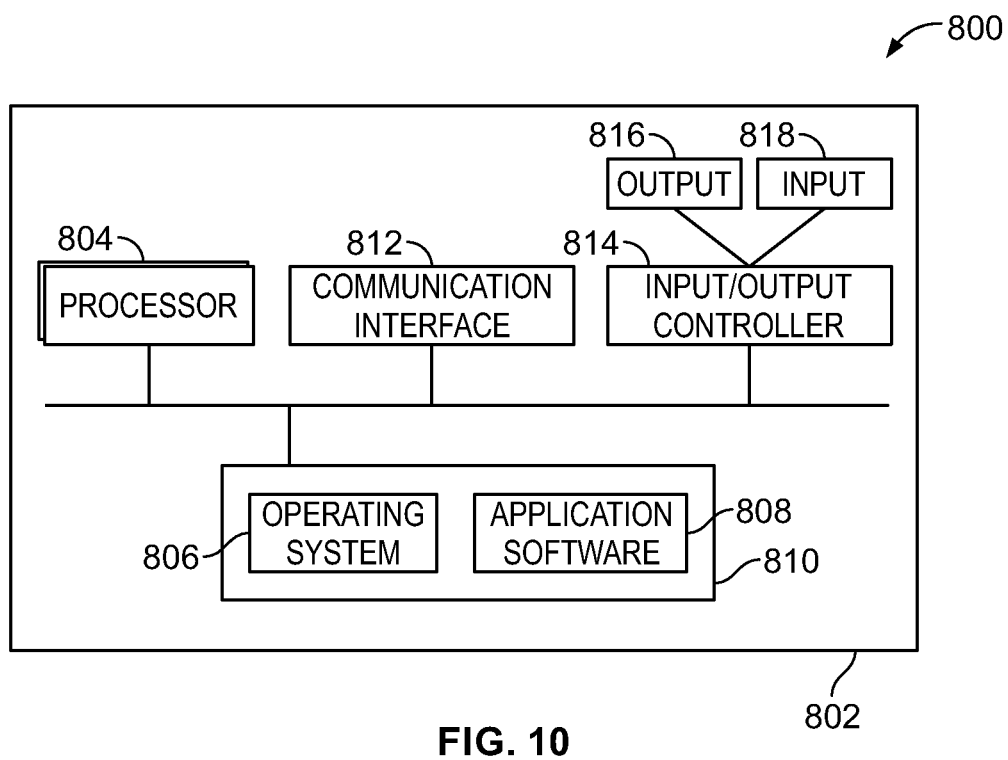
FIG. 10 illustrates an electronic device according to an implementation as a functional block diagram.

The present disclosure is operable with an electronic device (i.e., a computing apparatus) according to an implementation as a functional block diagram 800 in FIG. 10. In an implementation, components of a computing apparatus 802 are implemented as a part of an electronic device according to one or more implementations described in this specification. The computing apparatus 802 comprises one or more processors 804, for example microprocessors, controllers, and/or any other suitable type of processors for processing computer executable instructions to control the operation of the electronic device. In some implementations, platform software comprising an operating system 806 and/or any other suitable platform software is provided on the apparatus 802 to enable application software 808 to be executed on the device.

Computer executable instructions are provided using any computer-readable media that are accessible by the computing apparatus 802. Computer-readable media include, for example and without limitation, computer storage media such as a memory 810 and communications media. Computer storage media, such as a memory 810, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media embody computer readable instructions, data structures, program modules, and/or the like in a modulated data signal, such as a carrier wave and/or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 810) is shown within the computing apparatus 802, it will be appreciated by a person skilled in the art, that in some implementations the storage is distributed or located remotely and accessed via a network or other communication link (e.g. using a communication interface 812).

In some implementations, the computing apparatus 802 comprises an input/output controller 814 configured to output information to one or more output devices 816, for example a display and/or a speaker, which is separate from or integral to the electronic device. The input/output controller 814 is also configured, in some implementations, to receive and process an input from one or more input devices 818, for example, a keyboard, a microphone, and/or a touchpad. In one implementation, the output device 816 also acts as the input device. An example of such a device is a touch sensitive display. In some implementations, the input/output controller 814 also outputs data to devices other than the output device, e.g. a locally connected printing device. In some implementations, a user provides input to the input device(s) 818 and/or receives output from the output device(s) 816.

In some implementations, the functionality described herein is performed, at least in part, by one or more hardware logic components. According to an implementation, the computing apparatus 802 is configured by the program code when executed by the processor 804 to execute the implementations of the operations and functionality described. Alternatively, or in addition, the functionality described herein is performed, at least in part, by one or more hardware logic components. For example, and without limitation, illustrative types of hardware logic components include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs), and/or the like.

Although some of the present implementations are described and illustrated as being implemented in a server, controller, cloud service, smartphone, mobile phone, personal computer, and/or tablet computer, these are only examples of a device and not a limitation. As those skilled in the art will appreciate, the present implementations are suitable for application in a wide variety of different types of devices, such as portable and mobile devices, for example, in laptop computers, tablet computers, etc.

At least a portion of the functionality of the various elements in the figures can be performed by other elements in the figures, or an entity (e.g., processor, web service, server, application program, computing device, etc.) not shown in the figures.

Although described in connection with an example of a computing system environment, examples of the disclosure are capable of implementation with numerous other general purpose or special purpose computing system environments, configurations, and/or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, microprocessor-based systems, set top boxes, programmable consumer electronics, mobile telephones, mobile computing and/or communication devices, network PCs, minicomputers, mainframe computers, controllers, distributed computing environments that include any of the above systems and/or devices, and/or the like. Such systems and/or devices can accept input from the user in any way, including from input devices such as a keyboard or pointing device, via gesture input, proximity input (for example by hovering), and/or via voice input.

Implementations of the disclosure may be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform particular tasks or implement particular abstract data types. Aspects and implementations of the disclosure can be implemented with any number and organization of such components or modules. For example, aspects and implementations of the disclosure are not limited to the specific computer-executable instructions or the specific components or modules illustrated in the figures and described herein. Other examples of the disclosure can include different computer-executable instructions and/or components having more or less functionality than illustrated and described herein.

In examples involving a general-purpose computer, aspects and implementations of the disclosure transform the general-purpose computer into a special-purpose computing device when configured to execute the instructions described herein.

The following clauses describe further aspects:

Clause Set A:

A1. A method for installing a fastener into an opening of a structure, the fastener comprising a sleeve and a pin threadably received into the sleeve, the method comprising:
  inserting the fastener into the opening;
  grabbing a pintail of the pin;
  deforming a tail of the sleeve radially outward relative to a centerline axis of the fastener by automatically displacing the pin longitudinally along the centerline axis relative to the sleeve; and
  rotationally shearing the pintail of the pin from a shaft of the pin.

A2. The method of clause A1, wherein rotationally shearing the pintail of the pin from the shaft of the pin comprises rotating the pin relative to the sleeve until the pintail of the pin breaks from the shaft of the pin.

A3. The method of clause A1, further comprising waiting a predetermined amount of time after deforming the tail of the sleeve radially outward before rotationally shearing the pintail of the pin from the shaft of the pin.

A4. The method of clause A1, wherein deforming the tail of the sleeve radially outward by automatically displacing the pin longitudinally along the centerline axis relative to the sleeve comprises bracing against a side of the structure and a flange of the sleeve.

A5. The method of clause A1, wherein deforming the tail of the sleeve radially outward by automatically displacing the pin longitudinally along the centerline axis relative to the sleeve comprises pulling on the pin.

A6. The method of clause A1, wherein deforming the tail of the sleeve radially outward by automatically displacing the pin longitudinally along the centerline axis relative to the sleeve comprises automatically displacing the pin longitudinally along the centerline axis relative to the sleeve using a linear actuator.

A7. The method of clause A1, wherein rotationally shearing the pintail of the pin from the shaft of the pin comprises automatically rotating the pin relative to the sleeve using a rotary actuator.

A8. The method of clause A1, wherein grabbing the pintail of the pin comprises meshing with a spline of the pintail of the pin.

Clause Set B:

B1. A method for installing a fastener into an opening of a structure using a tool, the fastener comprising a sleeve and a pin threadably received into the sleeve, the method comprising:
  inserting the fastener into the opening;
  clamping a clamp of the tool to a pintail of the pin;
  deforming a tail of the sleeve radially outward relative to a centerline axis of the fastener by activating a linear actuator to displace the clamp longitudinally along the centerline axis relative to the structure such that the pin is displaced longitudinally along the centerline axis relative to the sleeve;
  grabbing the pintail of the pin with a wrench of the tool that is interconnected with the clamp; and
  rotationally shearing the pintail of the pin from a shaft of the pin by activating a rotary actuator to rotate the wrench of the tool.

B2. The method of clause B1, wherein rotationally shearing the pintail of the pin from the shaft of the pin comprises rotating the pin relative to the sleeve using the wrench until the pintail of the pin breaks from the shaft of the pin.

B3. The method of clause B1, wherein rotationally shearing the pintail of the pin from the shaft of the pin comprises rotating the wrench relative to the clamp of the tool.

B4. The method of clause B1, further comprising waiting a predetermined amount of time after deforming the tail of the sleeve radially outward before rotationally shearing the pintail of the pin from the shaft of the pin.

B5. The method of clause B1, wherein clamping the clamp of the tool to the pintail of the pin comprises grabbing a neck of the pintail of the pin.

B6. The method of clause B1, wherein grabbing the pintail of the pin with the wrench of the tool comprises meshing the wrench with a spline of the pintail of the pin.

B7. The method of clause B1, wherein inserting the fastener into the opening comprises automatically inserting the fastener into the opening with an interference fit.

Clause Set C:

C1. A tool for installing a fastener that includes a sleeve and a pin threadably received into the sleeve, the tool comprising:
  a frame;
  a clamp mounted to the frame such that the clamp is configured to move longitudinally relative to the frame, the clamp being configured to grab a pintail of the pin of the fastener;
  a linear actuator operatively connected to the clamp such that the linear actuator is configured to drive linear movement of the clamp relative to the frame;
  a wrench mounted to the frame such that the wrench is configured to rotate relative to the frame, the wrench being configured to grab the pintail of the pin; and
  a rotary actuator operatively connected to the wrench such that the rotary actuator is configured to drive rotation of the wrench relative to the frame.

C2. The tool of clause C1, wherein linear movement of the clamp relative to the frame along a centerline axis of the fastener is configured to move the pin of the fastener along the centerline axis relative to the sleeve of the fastener such that a tail of the sleeve deforms radially outward relative to the centerline axis.

C3. The tool of clause C1, wherein rotation of the wrench relative to the frame about a centerline axis of the fastener is configured to rotate the pin of the fastener relative to the sleeve of the fastener to thereby thread a shaft of the pin further into the sleeve, wherein further rotation of the wrench about the centerline axis relative to the frame is configured to break the pintail of the pin from the shaft of the pin.

C4. The tool of clause C1, wherein linear actuator comprises at least one of a pneumatic, hydraulic, or electric linear actuator.

C5. The tool of clause C1, wherein the rotary actuator comprises at least one of a pneumatic, hydraulic, or electric rotary actuator.

C6. The tool of clause C1, wherein the wrench is configured to rotate relative to the clamp.

C7. The tool of clause C1, wherein at least one of the clamp or the wrench comprises a socket that grabs the pintail of the pin.

C8. The tool of clause C1, wherein the clamp is configured to grab a neck of the pintail of the pin.

C9. The tool of clause C1, wherein the wrench comprises a spline that is configured to mesh with a spline of the pintail of the pin.

C10. The tool of clause C1, further comprising at least one processor configured to control activation of at least one of the linear actuator or the rotary actuator.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one implementation or can relate to several implementations. The implementations are not limited to those that solve any or all of the stated problems or those that have any or all of the stated benefits and advantages. It will further be understood that reference to 'an' item refers to one or more of those items.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation (e.g., different steps, etc.) is within the scope of aspects and implementations of the disclosure.

The term "comprising" is used in this specification to mean including the feature(s) or act(s) followed thereafter, without excluding the presence of one or more additional features or acts. The terms "comprising," "including," and "having" are intended to be inclusive and mean that there can be additional elements other than the listed elements. In other words, the use of "including," "comprising," "having," "containing," "involving," and variations thereof, is meant to encompass the items listed thereafter and additional items. Further, references to "one implementation" are not intended to be interpreted as excluding the existence of additional implementations that also incorporate the recited features. The term "exemplary" is intended to mean "an example of".

When introducing elements of aspects of the disclosure or the examples thereof, the articles "a," "an," "the," and "said" are intended to mean that there are one or more of the elements. In other words, the indefinite articles "a", "an", "the", and "said" as used in the specification and in the claims, unless clearly indicated to the contrary, should be understood to mean "at least one."

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described implementations (and/or aspects thereof) can be used in combination with each other. In addition, many modifications can be made to adapt a particular situation or material to the teachings of the various implementations of the disclosure without departing from their scope. While the dimensions and types of materials described herein are intended to define the parameters of the various implementations of the disclosure, the implementations are by no means limiting and are example implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method for installing a fastener into an opening of a structure, the fastener comprising a sleeve and a pin threadably received into the sleeve, the method comprising:
    inserting the fastener into the opening;
    automatically grabbing, via a tool having a clamp and a wrench, a pintail of the pin, wherein the clamp pushes and pulls the pin longitudinally relative to a centerline axis of the fastener and the wrench moves the pin rotationally relative to the centerline axis of the fastener;
    deforming a tail of the sleeve radially outward relative to the centerline axis of the fastener by automatically displacing, via a linear actuator in communication with a first activator, the pin longitudinally along the centerline axis relative to the sleeve, wherein deforming the tail of the sleeve radially outward comprises pulling on the pin; and
    rotationally shearing, via a rotary actuator in communication with a second activator, the pintail of the pin from a shaft of the pin, wherein rotationally shearing the pintail of the pin comprises automatically rotating the pin relative to the sleeve,
    wherein an activation of the linear actuator and the rotary actuator are to be controlled by one or more electronic devices, and wherein the one or more electronic devices control a positioning of the tool at an intended location of the structure within which the fastener is being installed.

2. The method of claim 1, wherein rotationally shearing the pintail of the pin from the shaft of the pin comprises rotating the pin relative to the sleeve until the pintail of the pin breaks from the shaft of the pin.

3. The method of claim 1, further comprising waiting a predetermined amount of time after deforming the tail of the sleeve radially outward before rotationally shearing the pintail of the pin from the shaft of the pin.

4. The method of claim 1, wherein deforming the tail of the sleeve radially outward by automatically displacing the pin longitudinally along the centerline axis relative to the sleeve comprises bracing against a side of the structure and a flange of the sleeve.

5. The method of claim 1, wherein grabbing the pintail of the pin comprises meshing with a spline of the pintail of the pin.

6. A method for installing a fastener into an opening of a structure using a tool, the fastener comprising a sleeve and a pin threadably received into the sleeve, the method comprising:
    inserting the fastener into the opening;
    clamping a clamp of the tool to a pintail of the pin, wherein the clamp pushes and pulls the pin longitudinally relative to a centerline axis of the fastener;
    deforming, via a linear actuator in communication with a first activator, a tail of the sleeve radially outward relative to a centerline axis of the fastener by activating the linear actuator to displace the clamp longitudinally along the centerline axis relative to the structure such that the pin is automatically displaced along the centerline axis relative to the sleeve, wherein deforming the tail of the sleeve radially outward comprises pulling on the pin;
    automatically grabbing the pintail of the pin with a wrench of the tool that is interconnected with the clamp; and
    rotationally shearing, via a rotary actuator in communication with a second activator, the pintail of the pin from a shaft of the pin by activating the rotary actuator to rotate the wrench of the tool,
    wherein an activation of the linear actuator and the rotary actuator are to be controlled by one or more electronic devices, and wherein the one or more electronic devices control a positioning of the tool at an intended location of the structure within which the fastener is being installed.

7. The method of claim 6, wherein rotationally shearing the pintail of the pin from the shaft of the pin comprises rotating the pin relative to the sleeve using the wrench until the pintail of the pin breaks from the shaft of the pin.

8. The method of claim 6, wherein rotationally shearing the pintail of the pin from the shaft of the pin comprises rotating the wrench relative to the clamp of the tool.

9. The method of claim 6, further comprising waiting a predetermined amount of time after deforming the tail of the sleeve radially outward before rotationally shearing the pintail of the pin from the shaft of the pin.

10. The method of claim 6, wherein clamping the clamp of the tool to the pintail of the pin comprises grabbing a neck of the pintail of the pin.

11. The method of claim 6, wherein grabbing the pintail of the pin with the wrench of the tool comprises meshing the wrench with a spline of the pintail of the pin.

12. The method of claim 6, wherein inserting the fastener into the opening comprises automatically inserting the fastener into the opening with an interference fit.

* * * * *